United States Patent
Wang et al.

(10) Patent No.: US 11,503,610 B2
(45) Date of Patent: Nov. 15, 2022

(54) USER EQUIPMENT COORDINATION FOR INTERFERENCE CANCELATION

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 264 days.

(21) Appl. No.: 16/833,560

(22) Filed: Mar. 28, 2020

(65) Prior Publication Data

US 2020/0322962 A1    Oct. 8, 2020

Related U.S. Application Data

(60) Provisional application No. 62/828,330, filed on Apr. 2, 2019.

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0053* (2013.01); *H04W 16/14* (2013.01); *H04W 72/042* (2013.01); *H04W 72/0413* (2013.01)

(58) Field of Classification Search
CPC ... H04J 11/005; H04W 16/14; H04W 72/082; H04W 72/0413; H04W 72/042; H04L 5/0053
See application file for complete search history.

(56) References Cited

U.S. PATENT DOCUMENTS

| 6,665,521 B1 | 12/2003 | Gorday et al. |
| 8,559,992 B2 | 10/2013 | Larsson et al. |

(Continued)

FOREIGN PATENT DOCUMENTS

| CN | 107211404 | * 9/2015 | ............ H04W 72/04 |
| EP | 2953393 | 12/2015 | |

(Continued)

OTHER PUBLICATIONS

"International Preliminary Report on Patentability", Application No. PCT/US2019/068265, dated Jan. 18, 2021, 31 pages.

(Continued)

*Primary Examiner* — Diane L Lo
*Assistant Examiner* — Abusayeed M Haque
(74) *Attorney, Agent, or Firm* — Colby Nipper PLLC

(57) ABSTRACT

Techniques and apparatuses are described for enabling user equipment to coordinate for interference cancelation. In some aspects, base stations form a user equipment coordination set by pairing a UE of a base station with another UE of another base station. The UE receives, from the other UE, information regarding an uplink transmission of the other UE to the other base station, the information including I/Q samples for the uplink transmission. Based on the received information, the UE can model interference from the uplink transmission of the other UE to a reception of a downlink transmission by the base station to the UE. After the UE receives the downlink transmission, the UE cancels, based on the modeling of the interference, the interference to the received downlink transmission from the uplink transmission of the other UE. By so doing, receiver performance or link quality of the interference-canceling UE can be improved.

20 Claims, 8 Drawing Sheets

(51) Int. Cl.
*H04J 11/00* (2006.01)
*H04W 72/04* (2009.01)
*H04W 16/14* (2009.01)

(56) References Cited

U.S. PATENT DOCUMENTS

| | | | |
|---|---|---|---|
| 9,699,731 B2 | 7/2017 | Khoryaev et al. | |
| 10,045,376 B2 | 8/2018 | Yang et al. | |
| 10,218,422 B2 | 2/2019 | Raghavan et al. | |
| 11,164,479 B1* | 11/2021 | Madison | G06T 19/006 |
| 2011/0158117 A1 | 6/2011 | Ho et al. | |
| 2011/0228666 A1* | 9/2011 | Barbieri | H04W 76/14 |
| | | | 370/216 |
| 2012/0157139 A1 | 6/2012 | Noh et al. | |
| 2013/0322276 A1* | 12/2013 | Pelletier | H04W 72/085 |
| | | | 370/252 |
| 2015/0098397 A1 | 4/2015 | Damnjanovic et al. | |
| 2015/0195795 A1 | 7/2015 | Loehr et al. | |
| 2016/0143074 A1* | 5/2016 | Wietfeldt | H04B 15/00 |
| | | | 370/329 |
| 2016/0192420 A1 | 6/2016 | Kim et al. | |
| 2016/0323832 A1 | 11/2016 | Love et al. | |
| 2016/0381630 A1* | 12/2016 | Krishnamoorthy | H04W 24/10 |
| | | | 370/329 |
| 2017/0078333 A1 | 3/2017 | Tevlin | |
| 2017/0188406 A1 | 6/2017 | Baligh et al. | |
| 2017/0339530 A1 | 11/2017 | Maaref | |
| 2018/0152949 A1 | 5/2018 | Guo et al. | |
| 2018/0254797 A1* | 9/2018 | Amini | H04W 72/0446 |
| 2019/0081657 A1 | 3/2019 | Zeng et al. | |
| 2019/0158909 A1* | 5/2019 | Kulkarni | H04N 21/4302 |
| 2020/0154442 A1 | 5/2020 | Zhou | |
| 2021/0321419 A1* | 10/2021 | Li | H04L 5/0051 |
| 2022/0006493 A1 | 1/2022 | Wang et al. | |

FOREIGN PATENT DOCUMENTS

| | | | | |
|---|---|---|---|---|
| GB | 2502603 | * | 5/2012 | H04W 72/08 |
| WO | 0237771 | | 5/2002 | |
| WO | WO-2016045745 | * | 9/2014 | H04W 76/02 |
| WO | WO-2016045745 A1 | * | 3/2016 | H04W 24/08 |
| WO | 2016081375 | | 5/2016 | |
| WO | 2017148173 | | 9/2017 | |
| WO | 2018010818 | | 1/2018 | |
| WO | WO-2019016141 | * | 7/2018 | H04W 72/04 |
| WO | WO-2019016141 A1 | * | 1/2019 | H04L 5/14 |
| WO | 2018130115 | | 7/2019 | |
| WO | 2020139811 | | 7/2020 | |

OTHER PUBLICATIONS

"3GPP TS 24.501 V16.3.0", 3GPP TS 24.501 version 16.3.0, Dec. 2019, 645 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"International Search Report and Written Opinion", PCT Application No. PCT/US2019/068265, dated Apr. 29, 2020, 29 pages.

"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.

"Third Generation Partnership Project; Technical Specification Group Services and System Aspects; Service requirements for the 5G system; Stage 1", 3GPP TS 22 261 version 16.10 0 Release 16, Dec. 2019, 72 pages.

Aboba, et al., "Extensible Authentication Protocol (EAP)", RFC Editor; Retrieved from https://www.rfc-editor.org/info/rfc3748, Jun. 2004, 67 pages.

Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.

Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.

Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.

"Written Opinion", Application No. PCT/US2019/068265, dated Sep. 25, 2020, 20 pages.

"Invitation to Pay Additional Fees", PCT Application No. PCT/US2019/068265, dated Mar. 13, 2020, 13 pages.

"UE Overheating for EN-DC", 3GPP R2-1802414, UE overheating for EN-DC, in 3GPP TSG-RAN WG2 Meeting #101, Apple Inc., Mar. 2, 2018, 3 pages.

Fodor, et al., "Design Aspects of Network Assisted Device-to-Device Communications", IEEE Communications Magazine, May 2011, May 2011, 9 pages.

Tavanpour, "Upload User Collaboration in the Data Upload for LTE-Advanced Networks", Carleton University, Ottawa, Ontario, 2016, 2016, 199 pages.

Wu, "Handling Overheating in a Wireless-Communication Device", Technical Disclosure Commons; Retrieved from https://www.tdcommons.org/dpubs_series/2343, Jul. 12, 2019, 22 pages.

"Foreign Office Action", IN Application No. 202147025618, dated Mar. 11, 2022, 5 pages.

* cited by examiner

USER EQUIPMENT COORDINATION FOR INTERFERENCE CANCELATION

PRIORITY APPLICATION

This application claims the benefit of U.S. Provisional Patent Application No. 62/828,330, filed Apr. 2, 2019, the disclosure of which is incorporated in its entirety by reference herein.

BACKGROUND

Generally, a provider of a wireless network manages wireless communications over the wireless network. For example, a base station manages a wireless connection with user equipment (UE) that is connected to the wireless network. The base station typically determines configurations for the wireless connection, such as bandwidth and timing for the wireless connection.

The link quality between the UE and the base station can be degraded due to several factors, such as loss in signal strength, interfering signals, and so forth. For example, a downlink or uplink of a UE can cause co-channel interference in another communication link (e.g., cross-link interference) of another UE. Several solutions have been developed to improve link quality. However, with recent advancements in wireless communication systems, such as Fifth Generation New Radio (5G NR), new approaches may be available.

SUMMARY

This document describes techniques and apparatuses of user equipment coordination for interference cancelation. In some aspects, the techniques enable base stations to form user equipment coordination sets (UE-coordination sets) in which user equipment of the UE-coordination set can share or exchange signal related information to enable interference cancelation. The apparatuses and techniques described herein overcome challenges that a UE may encounter when a transmission of another UE (e.g., an uplink) interferes with a reception by the UE of signals transmitted to the UE by a base station (e.g., a downlink). For example, such interference may prevent the UE from being able to receive a downlink from the base station or impair demodulation and decoding of the downlink by the UE.

In some aspects, a first user equipment (UE) of a UE-coordination set receives, from a second UE of the UE-coordination set, information regarding an uplink transmission of the second UE to a second base station. The information received from the second UE may include information describing signals of the uplink transmission (e.g., I/Q samples or I/Q information), when uplink transmission of the second UE is scheduled to occur, or which resources of an air interface the uplink transmission will use. Based on the received information, the first UE can model interference from the uplink transmission of the second UE to a reception of a downlink transmission by a first base station to the first UE. The first UE also receives the downlink transmission from the first base station. Based on the modeling of the interference, the first UE cancels the interference to the received downlink transmission from the uplink transmission of the second UE. By so doing, receiver performance of the interference-canceling UE can be improved.

In other aspects, a first UE comprises a radio frequency (RF) transceiver and a processor and memory system coupled to the RF transceiver. The memory system includes instructions that are executable by the processor to direct the first UE to receive, from a second UE, information regarding an uplink transmission of the second UE to a second base station, the received information including I/Q samples for the uplink transmission of the second UE. Based on the received information, the first UE models interference from the uplink transmission of the second UE to a reception of a downlink transmission by a first base station to the first UE. The first UE then receives the downlink transmission from the first base station and, based on the modeling of the interference, cancels the interference to the received downlink transmission from the uplink transmission of the second UE.

In yet other aspects, a computer-readable storage medium comprises instructions which, responsive to execution by a hardware-based processor, direct a first UE comprising the hardware-based processor to receive, and from a second UE, information regarding an uplink transmission of the second UE to a second base station. The received information may include I/Q samples for the uplink transmission of the second UE. Based on the received information, the first UE models interference from the uplink transmission of the second UE to a reception of a downlink transmission by a first base station to the apparatus. The first UE then receives the downlink transmission from the first base station and, based on the modeled interference, cancels the interference to the received downlink transmission from the uplink transmission of the second UE.

The details of one or more implementations of user equipment coordination for interference cancelation are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of user equipment coordination for interference cancelation are described below. The use of the same reference numbers in different instances in the description and the figures indicate similar elements.

DETAILED DESCRIPTION

Figure 1:
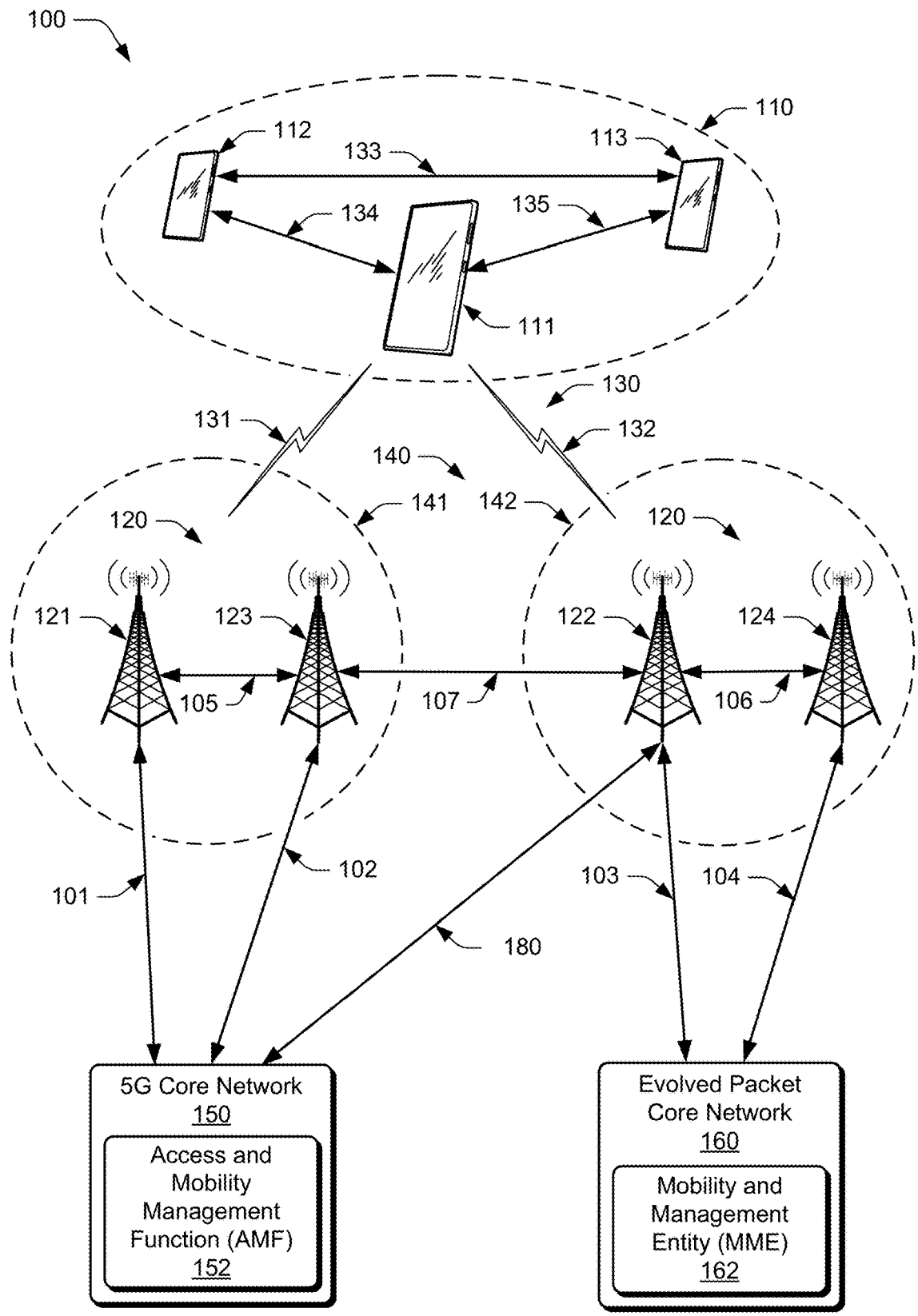
FIG. 1 illustrates an example operating environment in which various aspects of user equipment coordination for interference cancelation can be implemented.

In conventional wireless communication systems, a radio frequency (RF) signal quality (link quality) between a user equipment (UE) and a base station (BS) can degrade due to several factors, including signal interference, UE movement relative to the base station, or obstructions between the UE and the base station. This signal quality degradation may result in slower and less efficient data transmissions.

A type of interference, which may be referred to as "cross-link interference," can occur when one UE uses a set of air interface resources for a downlink at the same time a second UE uses at least a subset or portion of those same air interface resources for an uplink. Cross-link interference can be particularly strong between UEs of neighboring or adjacent base stations (or network cells), such as between UEs of different base stations that are proximate each other or near coverage boundaries of their respective base stations. In such cases, one of the UEs may transmit at or near maximum power in order to maintain a communication link with its base station, causing interference for other nearby UEs assigned to the intersecting air interface resources. As a result, the uplink of the UE transmitting over the intersecting air interface resources to one base station may cause or result in cross-link interference for other UEs attempting to receive downlinks from other respective base stations.

This document describes aspects of user equipment coordination for interference cancelation, which may be implemented to form a user equipment coordination set (UE-coordination set) between multiple UEs. Generally, the user equipment coordination set includes at least two UEs that communicate through a local wireless network connection, such as to share or distribute signal-related or schedule-related information for an uplink transmission by one of the UEs of the coordination set. Based on the signal-related and/or schedule-related information, one of the UEs can reduce or cancel cross-link interference caused by the uplink transmission of the other UE.

For example, a first UE of the UE-coordination set can receive, from a second UE of the UE-coordination set and through a local wireless network connection, information related to an uplink transmission of the second UE to a second base station. The information provided by the second UE may include signal-related information describing signals of the uplink transmission (e.g., in-phase and quadrature amplitude modulation (I/Q) samples or I/Q information) or scheduling information describing how or when uplink transmission is to occur (e.g., time, frequency, and/or modulation coding scheme (MCS) information). Based on this information, the first UE can model interference from the uplink transmission of the second UE to a reception of a downlink transmission by a first base station to the first UE. After the first UE receives the downlink transmission, the first UE cancels, based on the modeling of the interference, the interference to the downlink transmission from the uplink transmission of the second UE. By so doing, the first UE can reduce or cancel the interference caused by the uplink transmission of the second UE to the received downlink signals, thereby improving receive performance or communication link quality of the first UE.

In some aspects, a method performed by a first UE of a UE-coordination set includes receiving, from a second UE of the UE-coordination set, information regarding an uplink transmission of the second UE. The first UE is associated with a first base station that is different from a second base station to which the second UE is to transmit the uplink. The method includes modeling, based on the received information, interference from the uplink transmission of the second UE to a reception of a downlink transmission by the first base station to the first UE. The method also receives, by the first UE, the downlink transmission from the first base station. Based on the modeling of the interference, the first UE cancels the interference to the received downlink transmission from the uplink transmission of the first base station.

In other aspects, a first UE includes a radio frequency (RF) transceiver, as well as a processor and memory system coupled to the RF transceiver. The memory system stores instructions of the first UE that are executable by the processor to direct the first UE to receive, from a second UE, information regarding an uplink transmission of the second UE to a second base station. The instructions are executable to model, based on the received information, interference from the uplink transmission of the second UE to a reception of a downlink transmission by a first base station to the first UE. The first UE receives, via the RF transceiver, the downlink transmission from the first base station. The instructions are further executable to cancel, based on the modeling of the interference, the interference to the received downlink transmission from the uplink transmission of the second UE.

Example Environments

FIG. 1 illustrates an example operating environment 100 in which various aspects of user equipment coordination for interference cancelation can be implemented. Generally, the example environment 100 includes multiple user equipment 110 (UE 110), illustrated as UE 111, UE 112, and UE 113 of a UE-coordination set. Each UE 110 can communicate with base stations 120 (illustrated as base stations 121, 122, 123, and 124) through wireless communication links 130 (wireless link 130), illustrated as wireless links 131 and 132. Each UE 110 in a UE-coordination set can communicate with other UE 110 in the UE-coordination set through one or more local wireless network connections which are illustrated in this example as local wireless network connections 133, 134, and 135. The local wireless network connections can be implemented as any suitable type of wireless connection or link, such as a millimeter wave (mmWave) link, sub-millimeter wave (sub-mmWave) link, free space optical (FSO) link, wireless local access network (WLAN), wireless personal area network (WPAN), near-field communication (NFC), Bluetooth™, ZigBee™, radar, lidar, sonar, ultrasonic, or the like.

In some aspects, the base stations 120 provide configuration information to the UEs 110 to establish or manage the local wireless network connections. Alternately or additionally, the local wireless network connections 133, 134, or 135 can be configured to use an unlicensed frequency band. In such cases, the UEs 110 may coordinate to establish the local wireless network connections. In some aspects, the UEs 110 communicate over the local wireless network connections 133, 134, or 135 to share signal-related information or scheduling information associated with an uplink communication of one of the UEs 110. For simplicity, the UE 110 is implemented as a smartphone but may be implemented as any suitable computing or electronic device, such as a smart watch, mobile communication device, modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 through the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

The base stations 120 collectively form a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 connect to an Evolved Packet Core 160 (EPC 160). Alternately or additionally, the base station 122 may connect to both the 5GC 150 and EPC 160 networks.

The base stations 121 and 123 connect, at 101 and 102 respectively, to the 5GC 150 through an NG2 interface for control-plane signaling and using an NG3 interface for user-plane data communications. The base stations 122 and 124 connect, at 103 and 104 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 105 and the base stations 122 and 124 communicate through an X2 interface at 106 to exchange user-plane and control-plane data. The interface or link at 105 or 106 between the base stations 120 can be implemented as any suitable type of link, such as a mmWave link, a sub-mmWave link, or a FSO link. At least one base station 120 (base station 121 and/or base station 123) in the NR RAN 141 can communicate with at least one base station 120 (base station 122 and/or base station 124) in the E-UTRAN 142 using an Xn interface 107. In aspects, base stations 120 in different RANs (e.g., master base stations 120 of each RAN) communicate with one another using an Xn interface such as Xn interface 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Example Devices

Figure 2:
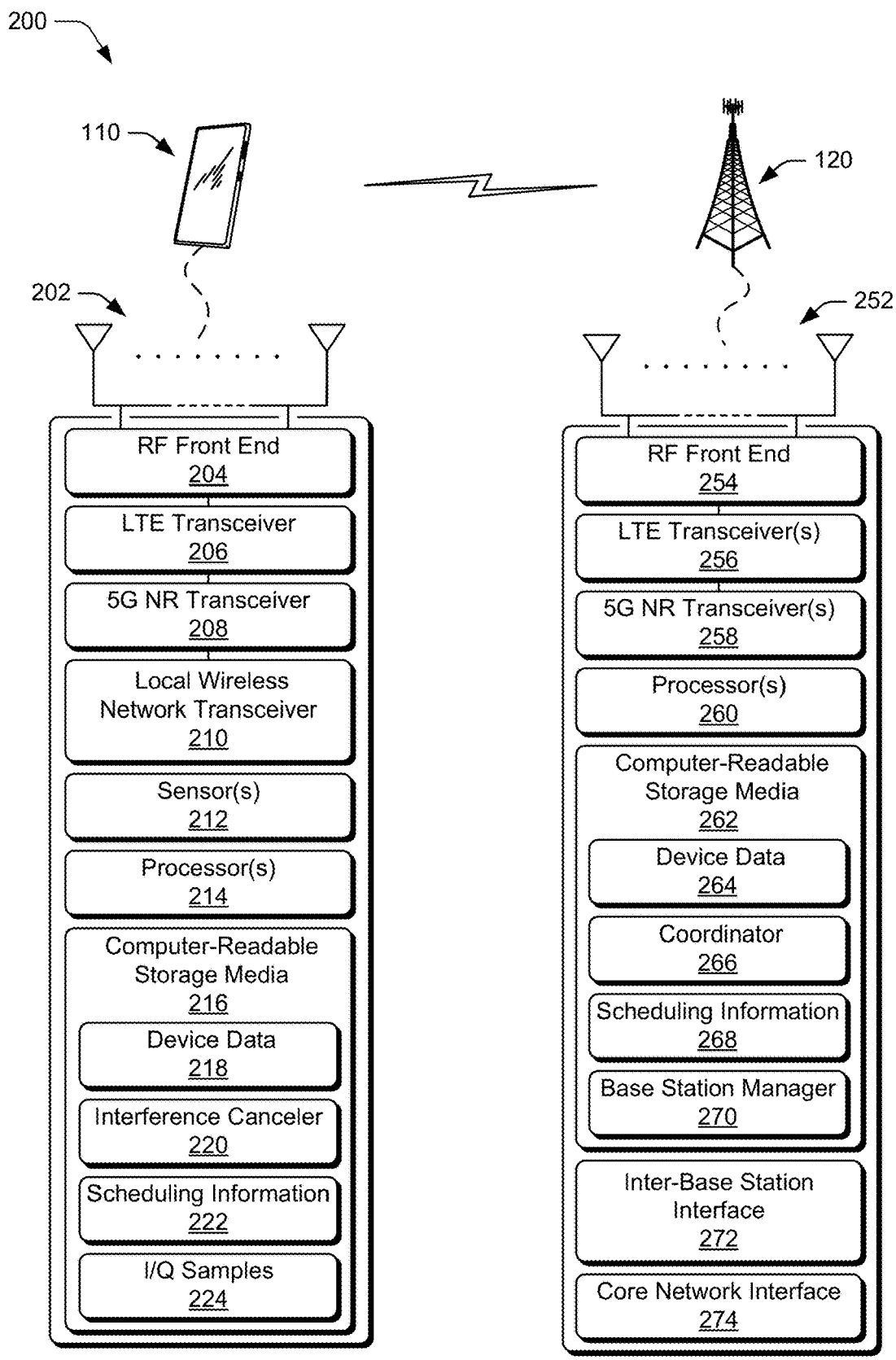
FIG. 2 illustrates an example device diagram of network entities that can implement various aspects of user equipment coordination for interference cancelation.

FIG. 2 illustrates an example device diagram 200 of a user equipment and a service cell base station. Generally, the device diagram 200 describes network entities that can implement various aspects of UE coordination for interference cancelation. FIG. 2 shows respective instances of the multiple UEs 110 and the base stations 120. The multiple UEs 110 and the base stations 120 may include additional functions and interfaces that are omitted from FIG. 2 for the sake visual brevity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more local wireless networks (e.g., WLAN, WPAN, Bluetooth™, NFC, Wi-Fi-Direct, IEEE 802.15.4, ZigBee, Thread, mmWave, sub-mmWave, FSO, radar, lidar, sonar, ultrasonic) with at least one other UE of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards (e.g., 57-64 GHz, 28 GHz, 38 GHz, 71 GHz, 81 GHz, or 92 GHz bands). In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor implemented with a homogenous or heterogenous core structure. The processor 214 may include a hardware-based processor implemented as hardware-based logic, circuitry, processing cores, or the like. In some aspects, functionalities of the processor 214 and other components of the UE 110 are provided via an integrated processing, communication, and/or control system (e.g., system-on-chip), which may enable various operations of a UE 110 in which the system is embodied. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

In aspects of user equipment coordination, the CRM 216 of the UE 110 may also include an interference canceler 220, scheduling information 222, and I/Q samples 224. Alternately or additionally, the interference canceler 220 may be implemented in whole or part as hardware logic or circuitry integrated with or separate from other components of the UE 110. Generally, the interference canceler 220 of the UE 110 can cancel or reduce interference caused by or associated with an uplink transmission of another UE 110. To do so, the interference canceler 220 may receive scheduling information 222 and/or signal-related information, such as I/Q samples 224, for an uplink transmission of the other UE. The I/Q (in-phase and quadrature amplitude modulation) samples 224 or data can be indicative of signal characteristics (amplitude, phase, etc.) of at least part of a transmission. Scheduling information or data may indicate MIMO (Multiple Input Multiple Output) modes and modulation modes at different points in time for the transmissions at the base-station coordination set. The scheduling data may indicate precise timing of transmissions within the base-station coordination set, including transmissions that have occurred in the past, as well as future transmissions that have yet to occur.

Based on the signal-related information, the interference canceler 220 can model, reconstruct, or estimate interference from the uplink transmission to a reception of a downlink transmission to the UE 110 by a base station. The interference canceler 220 can use the modeling of the interference to cancel the interference to the received downlink transmission from the uplink transmission of the first base station.

The interference canceler 220 can reduce or cancel interference in a variety of ways or procedures. In some aspects, modeled interference or reconstructed interference is subtracted from signals of the downlink at an I/Q level. Alternately or additionally, the interference canceler 220 can generate a filter based on the I/Q samples 224 and apply the generated filter to the signals of the downlink to cancel the interference. By so doing, the interference canceler 220 can reduce cross-link interference caused by the other UE 110 and improve receive performance of the UE 110. To communicate with another UE 110, the interference canceler 220 may also establish or configure a local wireless network connection with the other UE 110 to communicate or share the signal-related information. The implementations and uses of the interference canceler 220 vary and are described throughout the disclosure.

Aspects and functionalities of the UE 110 may be managed by operating system controls presented through an application programming interface (API). In some aspects, the interference canceler 220 accesses an API or an API service of the UE 110 to control aspects and functionalities of the user equipment or transceivers thereof. For example, the interference canceler 220 can access or utilize the LTE transceiver 214 or 5G NR transceiver 216 to model interference based on the I/Q samples 224, generate filters using the I/Q samples, or to subtract the modeled interference from received signals at the I/Q level. CRM 216 also includes a communication manager (not shown). The communication manager may also be implemented in whole or part as hardware logic or circuitry integrated with or separate from other components of the UE 110. In at least some aspects, the communication manager configures the RF front end 204, the LTE transceiver 206, the 5G NR transceiver 208, and/or the local wireless network transceiver 210 to implement the techniques of user equipment coordination for interference cancelation as described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

In aspects, the CRM 312 of the base station 120 also includes a user equipment set coordinator 266 (coordinator 266) and scheduling information 268. Alternately or additionally, the coordinator 266 may be implemented in whole or part as hardware logic or circuitry integrated with or separate from other components of the base station 120. The scheduling information 268 can be used to setup an uplink transmission from a UE 110 or provided to another UE 110 to assist with interference cancelation.

Generally, the coordinator 266 enables the base station 120 to coordinate with other base stations 120 to form UE-coordination sets for interference cancelation. For example, the base station 120 may pair, select, or group UEs that are configured to use same time and frequency resources (e.g., candidates for interference cancelation). Alternately or additionally, the base station 120 or coordinator 266 may select UEs 110 that are close to each and/or near a respective edge of cell coverage provided by the base stations 120. In some cases, the coordinator 266 accounts for or considers mutual interference between the base stations 120 when determining which UEs 110 of the respective cells to group for the UE-coordination set.

The coordinator 266 of the base station 120 may also enable or configure a local wireless network connection between the UEs 110 of the UE-coordination set, such as to facilitate sharing of signal-based information or scheduling information 268 of an uplink transmission. For example, the coordinator 266 may allocate resources of a local wireless network connection that is available to both UEs 110 of the UE-coordination set and then provide an indication of the allocated resources to at least one of the UEs 110. By so doing, the UEs can establish the local wireless network connection for sharing information (e.g., I/Q samples) to enable interference cancelation.

CRM 262 also includes a base station manager 270. Alternately or additionally, the base station manager 270 may be implemented in whole or part as hardware logic or circuitry integrated with or separate from other components of the base stations 120. In at least some aspects, the base station manager 270 configures the LTE transceivers 256 and the 5G NR transceivers 258 for communication with the UE 110, as well as communication with a core network. The base stations 120 include an inter-base station interface 272, such as an Xn and/or X2 interface, which the base station manager 270 configures to exchange user-plane and control-plane data between another base station 120, to manage the communication of the base stations 120 with the UE 110. The base stations 120 include a core network interface 274 that the base station manager 270 configures to exchange user-plane and control-plane data with core network functions and/or entities.

Figure 3:
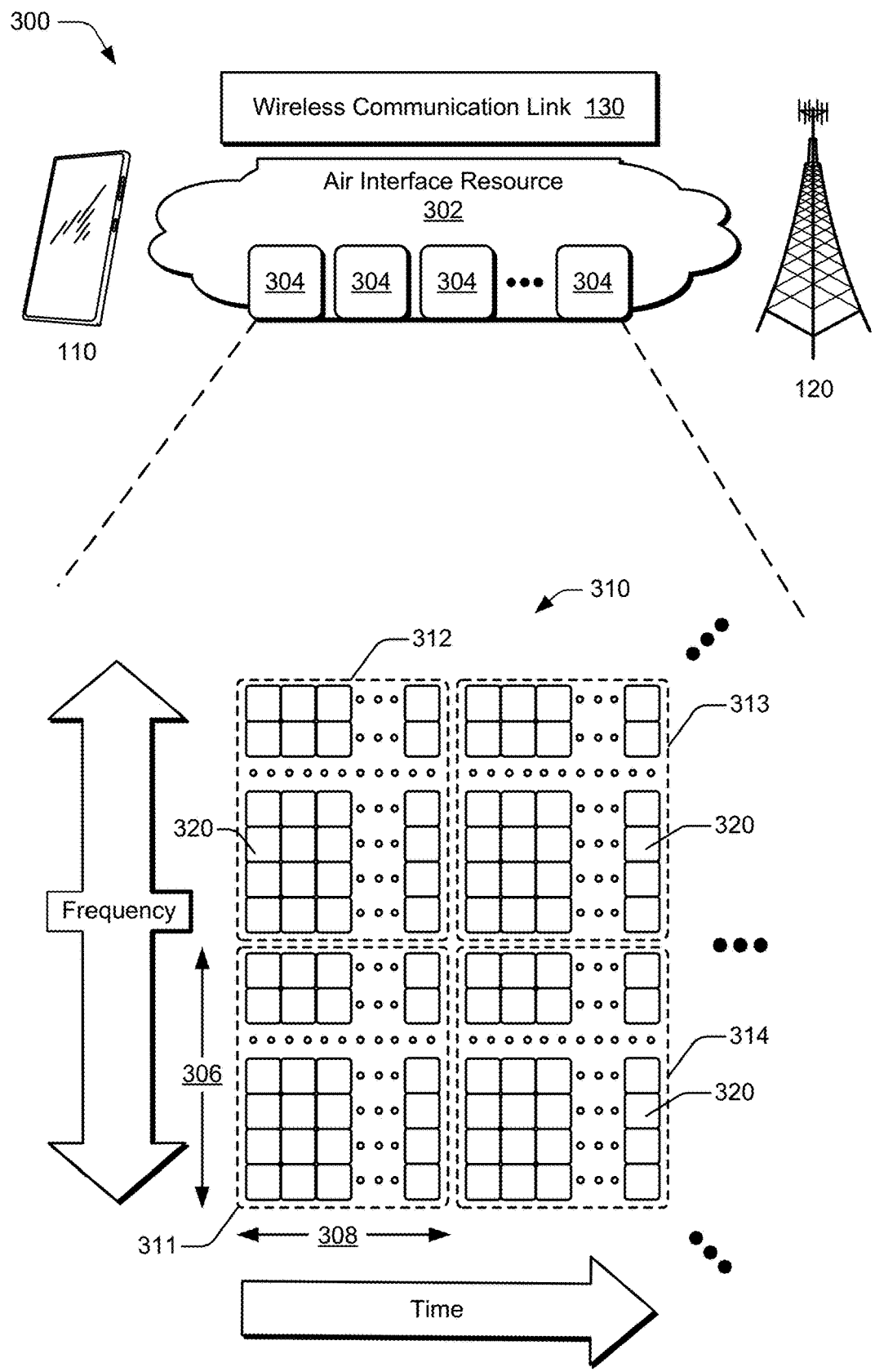
FIG. 3 illustrates an example an air interface resource that extends between a user equipment and a base station and with which various aspects of user equipment coordination for interference cancelation can be implemented.

FIG. 3 illustrates an air interface resource that extends between a user equipment and a base station and with which various aspects of a UE-coordination set for a wireless network using an unlicensed frequency band can be implemented. In aspects, base stations 120 may determine that UEs 110 have respective air interface resources that intersect such that cross-link interference may occur. As such, the base stations 120 may form a UE-coordination set to enable one of the UEs to cancel potential interference caused by another UE of the UE-coordination set. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The base station manager 270 (shown in FIG. 2) may determine a respective data-rate, type of information, or amount of information (e.g., data or control information) to be communicated (e.g., transmitted) by the user equipment 110. For example, the base station manager 270 can determine that each user equipment 110 is to transmit at a different respective data rate or transmit a different respective amount of information. The base station manager 270 then allocates one or more resource blocks 310 to each user equipment 110 based on the determined data rate or amount of information.

Additionally, or in the alternative to block-level resource grants, the base station manager 270 may allocate resource units at an element-level. Thus, the base station manager 270 may allocate one or more resource elements 320 or individual subcarriers to different user equipment 110. By so doing, one resource block 310 can be allocated to facilitate network access for multiple user equipment 110. Accordingly, the base station manager 270 may allocate, at various granularities, one or up to all subcarriers or resource elements 320 of a resource block 310 to one user equipment 110 or divided across multiple user equipment 110, thereby enabling higher network utilization or increased spectrum efficiency.

The base station manager 270 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the base station manager 270 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

User Equipment Coordination Set

Figure 4:
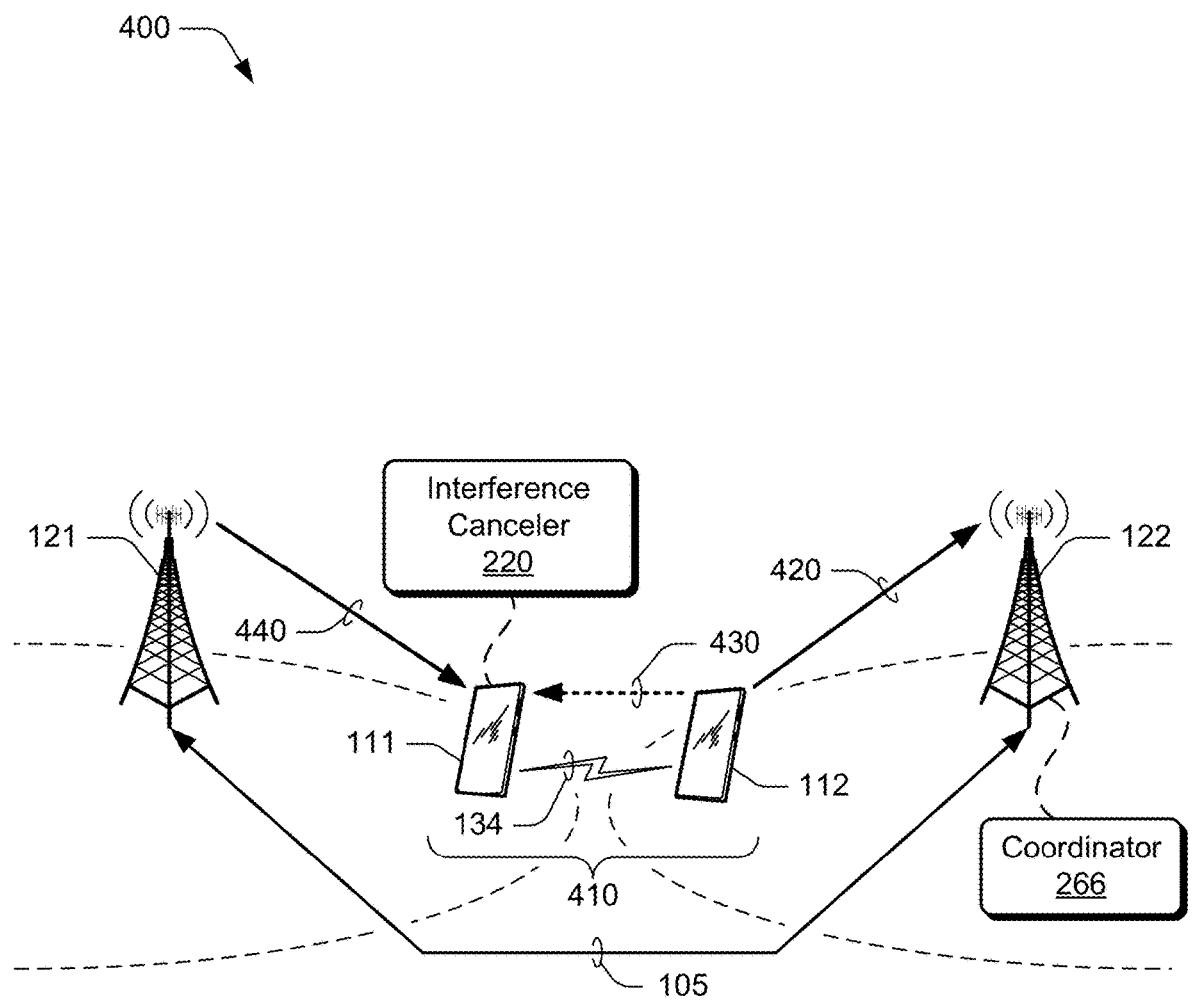
FIG. 4 illustrates an example environment in which a user equipment coordination set is implemented in accordance with one or more aspects.

FIG. 4 illustrates an example environment at 400 in which a user equipment coordination set 410 is implemented in accordance with one or more aspects. In this example, connection with a radio access network is provided by base stations 121 and 122, each of which manages respective UEs. In this example, assume that base station 121 manages UE 111 and base station 122 manages UE 112 of the user equipment coordination set 410. By way of review, cross-link interference can occur when a UE 111 uses a set of air interface resources for a downlink at the same time another UE 112 uses at least a subset or portion of those same air interface resources for an uplink. Depending on the resource allocations (time and frequency) of downlinks and uplinks to each UE, cross-link interference may affect UE 111 at certain times and affect UE 112 at other times. Cross-link interference may also be more likely to occur when UEs 110 of neighboring or adjacent base stations (or network areas) are proximate each other as shown in FIG. 4.

In particular, this situation may arise when a radio access network operates in a time division duplex (TDD) mode of operation where UEs transmit uplink and downlink communications on a same carrier frequency but are separated in time by designating subframes for either uplink or downlink communication. In some TDD networks, respective timing configurations of each network cell (or base station) may be configured or reconfigured depending on network traffic demands on a cell-by-cell basis. In some cases, this results in two adjacent cells having overlapping air interface resources allocated to more than one UE for a time such that the uplink of one UE occurs during a downlink reception of another UE of the wireless network. Although reference here is made to network "cells", this situation may similarly apply to adjacent or proximate network areas, base stations, base station-UE coordination sets, or the like where cross-link interference can occur.

In aspects of user equipment coordination for interference cancelation, a coordinator 266 of the base stations 120 can group UEs 110 into a UE-coordination set 410 to address crosslink interference. For example, the coordinator 266 can determine that two of the UEs 110 have air interface resources that intersect such that cross-link interference may occur. The coordinator 266 may also account for mutual interference between the base stations 121 and 122 when determining which UEs 110 to group for the UE-coordination set 410. Alternately or additionally, a coordinator 266 of the base stations 120 may analyze a respective signal strength, transmit power, mobility state, power capability, or geographic location of the UE 110 when determining which UEs to group for the UE-coordination set 410.

As part of the UE-coordination set 410, the coordinator 266 or base stations 120 may allocate resources of a local wireless network connection 134 that is available to the UE 111 and the UE 112. In some cases, this enables the UEs 110 to share signal-related information and/or scheduling information associated with an uplink by one of the UEs 110. Based on this information, an interference canceler 220 of the other UE 110 can model, reconstruct, or estimate interference from the uplink to a reception of a downlink transmission from a base station to the other UE 110. Using the modeled interference, the interference canceler 220 can cancel or reduce interference of the uplink transmission of the UE 112 to reception of the downlink by the UE 111. By so doing, receiver performance of the interference-canceling UE can be improved for downlink reception.

With reference to FIG. 4, an example of this is illustrated by UEs 111 and 112 which are configured as a UE-coordination set 410 by the base stations 120. Here, assume that UE 112 transmits, over local wireless network connection 134, I/Q samples that are determined for performing an uplink 420 transmission to base station 122. The UE 111 may also receive scheduling information for the uplink 420 from the UE 112 through the local wireless network connection 134 or from the base station 121 through another downlink (e.g., relayed from base station 122 via a base station interface, such as an Xn interface). The UE 112 then transmits the uplink 420 to the base station 122 based on the I/Q samples and scheduling information. As a result of the transmission of the uplink 420, the UE 111 may receive interference 430 (caused by the uplink 420) with a downlink 440 transmitted by the base station 121.

To cancel the interference 430 to the downlink 440, the interference canceler 220 models, based on the I/Q samples, the interference caused by or associated with the uplink 420 of the other UE 112. The interference canceler 220 then subtracts the modeled interference from the received signals to cancel at least a portion of the interference 430 to the downlink 440 received from the base station 121. In some cases, the interference canceler 220 reduces or cancels the interference at an I/Q signal level based on the modeled interference. After the interference is removed from the received downlink signals, the downlink signals can be demodulated and decoded for data or other control information of the downlink from the base station 121.

Figure 5:
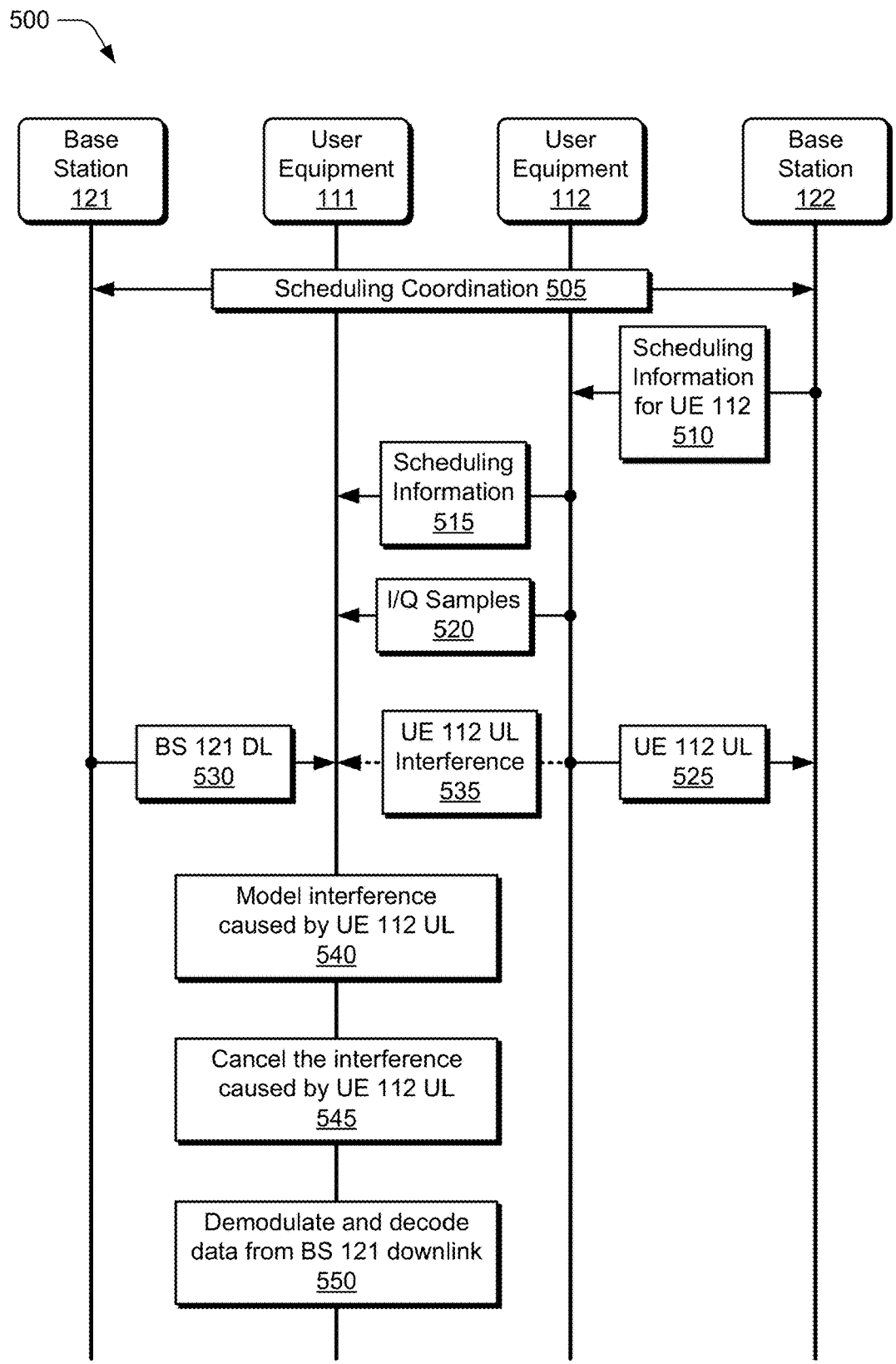
FIG. 5 illustrates an example transaction diagram of base stations and user equipment of a coordination set implementing interference cancelation.

FIG. 5 illustrates an example of transactions among various network entities in accordance with aspects of user equipment coordination for interference cancelation. The base stations 121 and 122 and the UEs 111 and 112 may be implemented similar to the entities described with reference to FIGS. 1-4. Generally, the transactions of FIG. 5 are described in the context of the environment of FIG. 4 in which a first UE 111 (e.g., victim UE) is subject to interference caused by the uplink transmission of a second UE 112 (e.g., aggressor UE). As such, the base station 121 and base station 122 may form a UE-coordination set 410 that enables the UE 111 to reduce or cancel the interference that occurs during reception of a downlink transmission from the base station 121.

At 505, the base station 121 and base station 122 perform scheduling coordination, such as to determine which UEs of their respective cells, BS-UE coordination sets, or coverage areas to group for user equipment coordination. For example, the base stations 121 and 122 may pair, select, or group UEs that are configured to use overlapping time and frequency resources when the interference cancelation is enabled between the UEs. For example, there may be more than one victim UE and/or more than one aggressor UE. In some cases, the base station 121 and 122 account for or consider mutual interference between the base stations when determining which UEs to group for the UE-coordination set. The base stations 120 may also analyze a respective signal strength, transmit power, mobility state, power capability, or geographic location of UEs when determining which UEs to group for the UE-coordination set.

In some aspects, the base stations 120 send layer-2 messages (e.g., Media Access Control layer) and/or layer-3 (e.g., Service Data Adaptation Protocol layer) messages to UEs 110 to direct or request those UEs to join the UE-coordination set 410. The base stations 120 can provide additional data to the UEs 110 within the UE-coordination set to enable the UEs to communicate directly with other UEs of the UE-coordination set. The additional data may include an identity of a coordinating UE for the UE-coordination set, security information, and/or local wireless network information.

At 510, the base station 122 transmits scheduling information to the UE 112 for an uplink transmission by the UE 112. The scheduling information for the uplink may include channel information, timing information, frequency information, or MCS information. At 515, the UE 112 transmits, through a local wireless network connection, the scheduling information to the UE 111. Thus, the UE 111 may receive information related to timing, frequency, or an MCS of the scheduled uplink.

At 520, the UE 112 transmits, through the local wireless network connection, I/Q samples to the UE 111. The UE 112 may determine or generate the I/Q samples, I/Q data, or other quadrature information in preparation for the uplink transmission. At 525, the UE 112 transmits the uplink to the base station 122 based on the I/Q samples and in accordance with the scheduling information.

At 530, the UE 111 receives a downlink transmission from the base station 121 during transmission of the uplink by the UE 112. At 535, the UE 111 may also receive the interference caused by the uplink transmission of the UE 112 to the base station 122. For example, the received signals of the downlink can include the interference caused by the cross-link uplink transmitted by the UE 112.

At 540 the UE 111 models, based on the I/Q samples, interference caused by or associated with the scheduled uplink transmission of the UE 112 at 525. For example, the UE 111 may model, reconstruct, or estimate the interference cause by the uplink based on the I/Q samples previously received from the UE 112 at 520. Alternately or additionally, the UE 111 may model the interference based on additional signaling information, such as timing information, frequency information, or MCS information received from the UE 112 or through the base station 121 (e.g., provided by the base station 122) at 515. Note that 540 may occur anytime between 520 and 545.

At 545, based on the modeled interference, the UE 111 cancels the interference to the received downlink transmission caused by the uplink transmission of the UE 112. In some cases, the UE 111 reduces or cancels the interference at an I/Q signal level based on the modeled interference. For example, the UE 111 may subtract the modeled or estimated interference from demodulated receive signals of the downlink that are affected by the cross-link interference. Alternately or additionally, the UE 111 may apply a filter generated using the I/Q data to the signals of the received downlink transmission to cancel the interference.

At 550, the UE 111 demodulates the received downlink signals from which the interference is canceled. By canceling or reducing the interference caused by the uplink transmission, receive performance of the UE 111 can be improved. At 550, the UE 111 decodes, from the demodulated downlink, data or control information transmitted by the base station 121 to the UE 111. In some cases, canceling the interference from the downlink is effective to improve decoding performance of the UE 111 or reduce a number of retransmissions needed to enable successful data decoding operations.

Example Methods

Example methods 600 through 800 are described with reference to FIGS. 6-8 in accordance with one or more aspects of user equipment coordination for interference cancelation. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
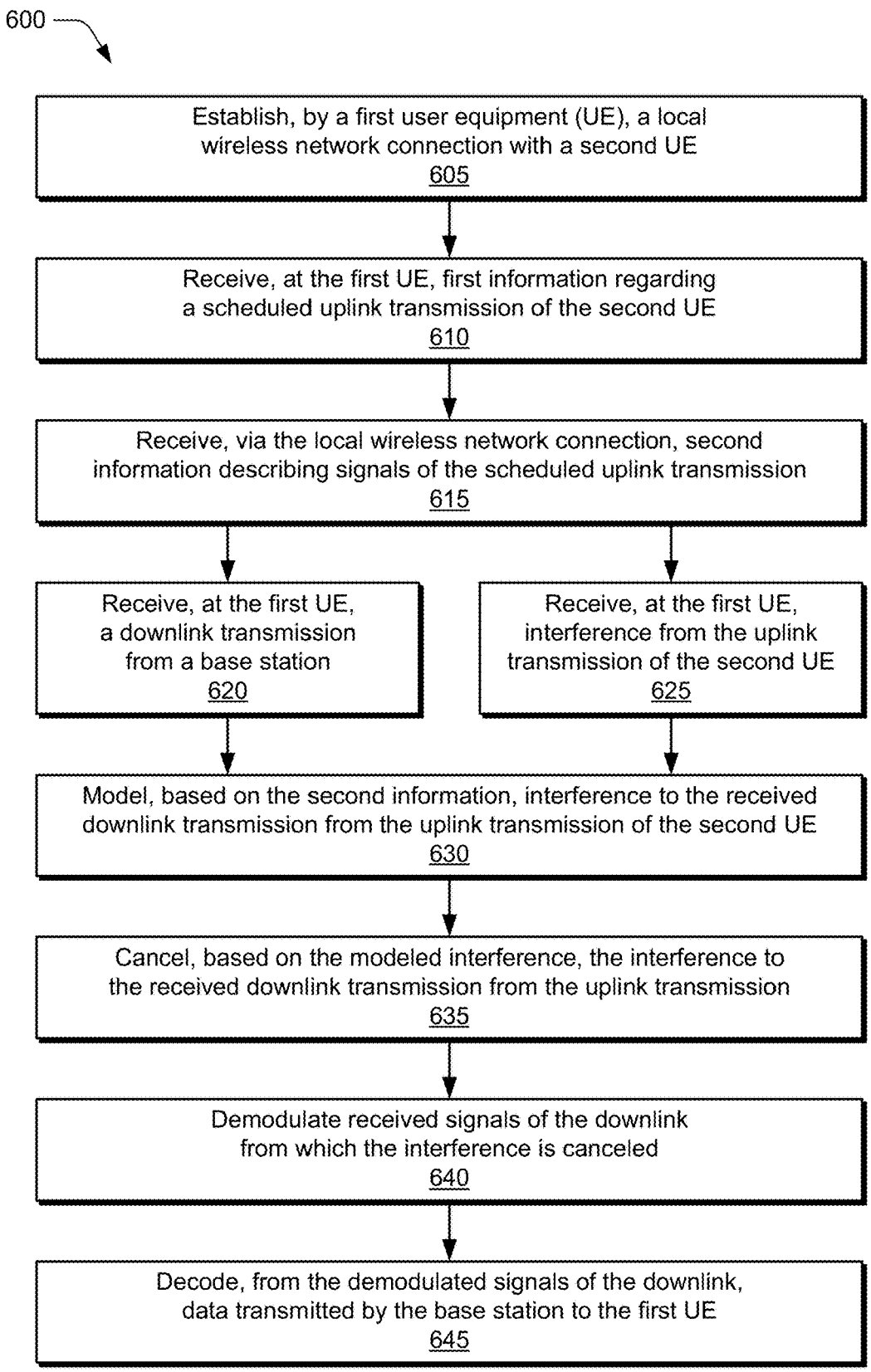
FIG. 6 illustrates an example method for canceling interference from a received downlink transmission.

FIG. 6 illustrates an example method for canceling interference from a received downlink transmission. In some aspects, operations of the method 600 are implemented by an interference canceler 220 of a UE 110. Alternately or additionally, the operations of the method 600 can be implemented by other entities described herein, such as by UEs 110 of a UE-coordination set 410.

At 605, a first UE establishes a local wireless network connection with a second UE. The first UE is managed by a first base station of a wireless network and the second UE is managed by a second base station of the wireless network. The local wireless network connection established between the first UE and the second UE may include a millimeter wave link, a sub-millimeter wave link, a free space optical link, or a wireless local access network link. The local wireless network connection between the first UE and the second UE can be implemented in a licensed frequency band or an unlicensed frequency band. In some cases, the first UE receives, from the first base station, information useful to configure the local wireless network connection with the second UE. In other cases, the first UE may determine or generate the information useful to configure the local wireless network connection. This information may include or indicate a type of the local wireless network connection, frequency band of the local wireless network connection, frequency resources of the local wireless network connection, or time resources of the local wireless network connection.

At 610, a first UE receives first information regarding a scheduled uplink transmission of a second user equipment. The first information may include scheduling information indicating frequency and time scheduling information for air interface resources allocated (e.g., by the second base station) to the second UE for the uplink transmission similar to 515. The first UE may receive the first information directly from the second UE or indirectly from the first base station, such as when the first information is relayed from the second base station to the first base station via an Xn interface and then transmitted from the first base station to the first UE.

At 615, the first UE receives second information describing signals of the scheduled uplink transmission of the second UE similar to 520. The second information include I/Q samples, I/Q information, quadrature signals, or other information associated with the uplink transmission. Alternately or additionally, the second information may include time resources, frequency resources, and/or a modulation coding scheme (MCS) of the uplink transmission.

At 620, the first UE receives a downlink transmission from the first base station during transmission of the uplink by the second UE similar to 530. For example, the first base station may initiate a downlink transmission to provide control information or data to the first UE. At 625, the first UE may also receive interference caused by the uplink transmission of the second UE to the second base station similar to 535. In some cases, the receive signals of the downlink include this interference caused by the cross-link uplink transmitted by the second UE.

At 630, the first UE models, based on the second information, interference to the received downlink transmission from the uplink transmission of the second UE similar to 540. This interference may be caused by or associated with the scheduled uplink transmission of the second UE. For example, the first UE may model, reconstruct, or estimate the interference cause by the uplink based on I/Q samples or I/Q information received from the second UE. In some cases, the first UE generates, using the I/Q samples, a filter for canceling the interference from a reception of a downlink transmission. Alternately or additionally, the first UE can model the interference based on additional signaling information, such as timing information, frequency information, or MCS information received from the second UE or relayed through the first base station (e.g., provided by the second base station). In some cases, the first UE uses a non-Gaussian interference estimation calculation to model the interference based on the second information.

At 635, the first UE cancels, based on the modeled interference, the interference to the received downlink transmission from the uplink transmission similar to 545. In some cases, the first UE reduces or cancels the interference at an I/Q signal level based on the modeled interference. For example, the first UE may subtract the modeled or estimated interference from demodulated receive signals of the downlink that are affected by the cross-link interference. Alternately or additionally, the first UE may apply the generated filter to the received signals of the downlink transmission to cancel the interference.

At 640, the first UE demodulates the received downlink from which at least the portion of the interference is canceled similar to 550. Alternately or additionally, the received downlink may be demodulated before or during interference cancelation operations. By canceling or reducing at least a portion of the interference caused by the uplink transmission, receive performance of the first UE can be improved. At 645, the first UE decodes, from the demodulated downlink, data or control information transmitted by the first base station to the first UE similar to 550.

Figure 7:
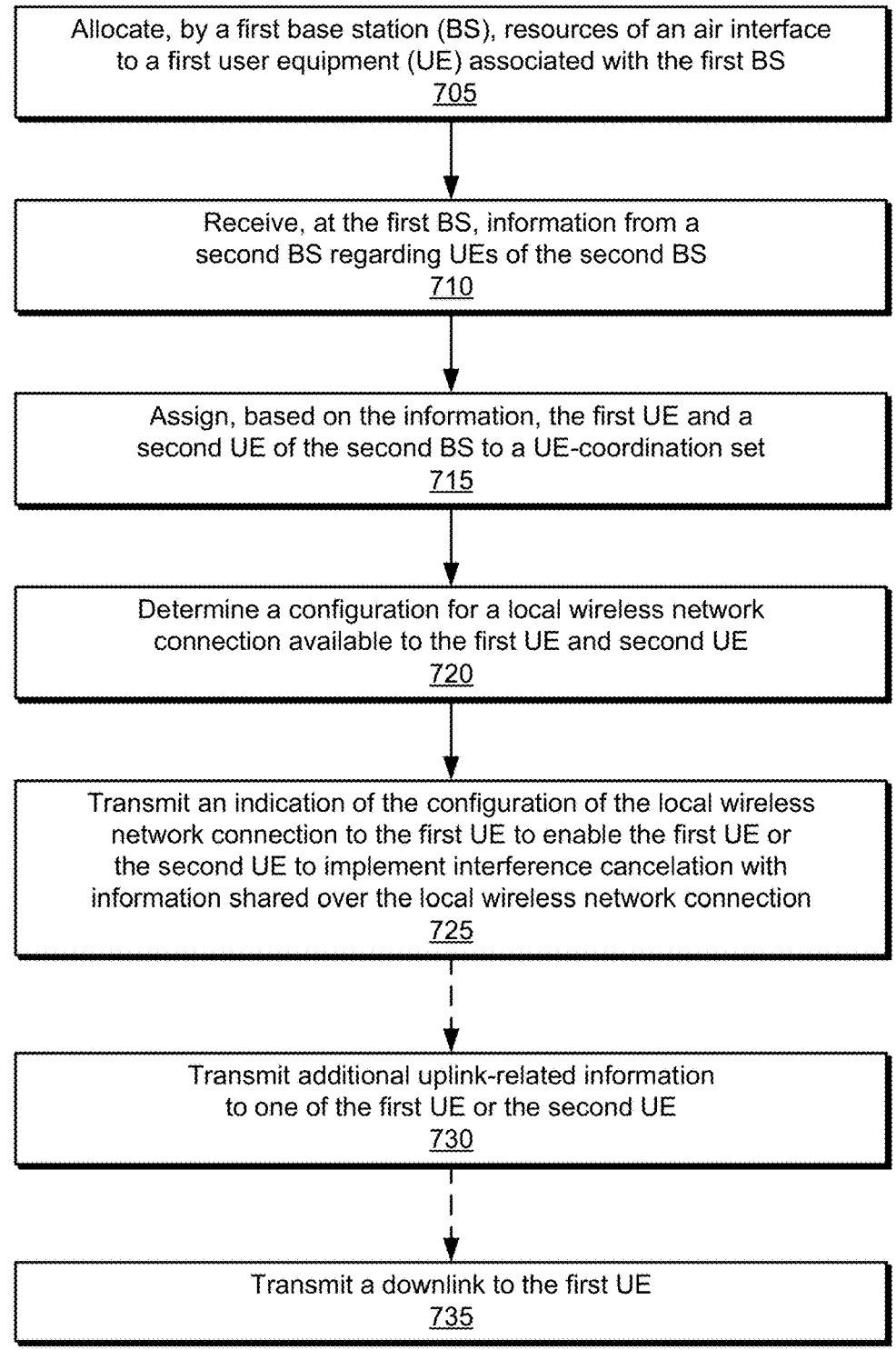
FIG. 7 illustrates an example method for forming a user equipment coordination set in accordance with one or more aspects.

FIG. 7 illustrates an example method for forming a user equipment coordination set in accordance with one or more aspects. In some implementations, operations of the method 700 are performed by a coordinator 266 of a base station 120. Alternately or additionally, the operations of the method 700 can be implemented by other entities described herein, such as the base stations 120.

At 705, a first base station allocates resources of an air interface to a first UE of a first cell managed by the first base station. The first base station may allocate the resources or configure the first base station as part of managing the first base station or in association with handover operations when the first base station enters a network cell managed by the first base station. In some cases, the first base station collects or determines information regarding multiple UEs associated with or being managed by the first base station. This information may include a respective signal strength, transmit power, mobility state, power capability, local wireless network connection capability, UE-coordination set capability (e.g., interference cancelation capabilities), or location of UEs in a cell of the first base station.

At 710, the first base station receives information from a second base station regarding UEs of a second cell managed by the second base station similar to 505. The first base station and second base station may communicate over an Xn interface, such as an Xn interface implemented through a wireline link. The information provided by the second base station may include a respective signal strength, transmit power, mobility state, power capability, local wireless network connection capability, UE-coordination set capability, or location of the UEs of the second cell.

At 715, the first base station assigns, based on the information, the first UE of the first cell and a second UE of the second cell to a UE-coordination set. This operation may be performed in coordination with the second base station similar to 505. For example, the first base station or base stations may pair, select, or group UEs that are configured to use same time and frequency resources. Alternately or additionally, the base stations may select UEs that are close to each and/or near a respective edge of cell coverage provided by the base stations. In some cases, the base stations account for or consider mutual interference between the base stations when determining which UEs of the respective cells to pair up for the UE-coordination set. Alternately or additionally, one of base stations may analyze a respective signal strength, transmit power, mobility state, power capability, or location of UEs when determining which UEs to pair for the UE-coordination set. In some aspects, the first base station transmits a message or indication to the first UE to assign the first UE to the UE-coordination set. For example, the first base station can transmit a layer-2 message and/or layer-3 message to the first UE to direct or request that first UE to join the UE-coordination formed by the first base station.

At 720, the first base station allocates resources of a local wireless network connection available to the first UE and second UE. This allows the first UE and the second UE to share signal-related information or schedule-related information, which may be used by one of the UEs for interference cancelation. Generally, the first UE and the second UE are configured to communicate directly over the local wireless network connection, though information may be provided or relayed through a respective base station to a UE. The local wireless network connection can include a millimeter wave link, a sub-millimeter wave link, a free space optical link, or a wireless local access network link.

At 725, the first base station transmits an indication of the allocated resources of the local wireless network connection to the first UE. In some cases, the first base station also transmits the indication to the second base station, which then relays the indication to the second UE. Thus, the first base station may use the second base station to relay the indication to the second UE that is not directly managed by the first base station. Providing the indication to the first UE and the second UE of the UE-coordination set enables the UEs to communicate or share information for implementing interference cancelation. The indication transmitted to the UEs may indicate a type of the local wireless network connection, frequency band of the local wireless network connection, frequency resources of the local wireless network connection, or time resources of the local wireless network connection.

Optionally at 730, the first base station transmits additional uplink-related information to the first UE. The additional information may include scheduling information for the uplink transmission of the second UE. In some aspects, the scheduling information is transmitted to the UE that is not performing the uplink transmission, such as to enable or assist the UE in interference cancelation. Alternately, the second UE can transmit the scheduling information to the first UE, such as over the local wireless network connection between the UEs.

Optionally at 735, the first base station transmits a downlink to the first UE through the air interface resources allocated to the first UE. For example, the first base station can transmit a downlink of data to the first UE, which is capable or configured to perform interference cancelation.

Figure 8:
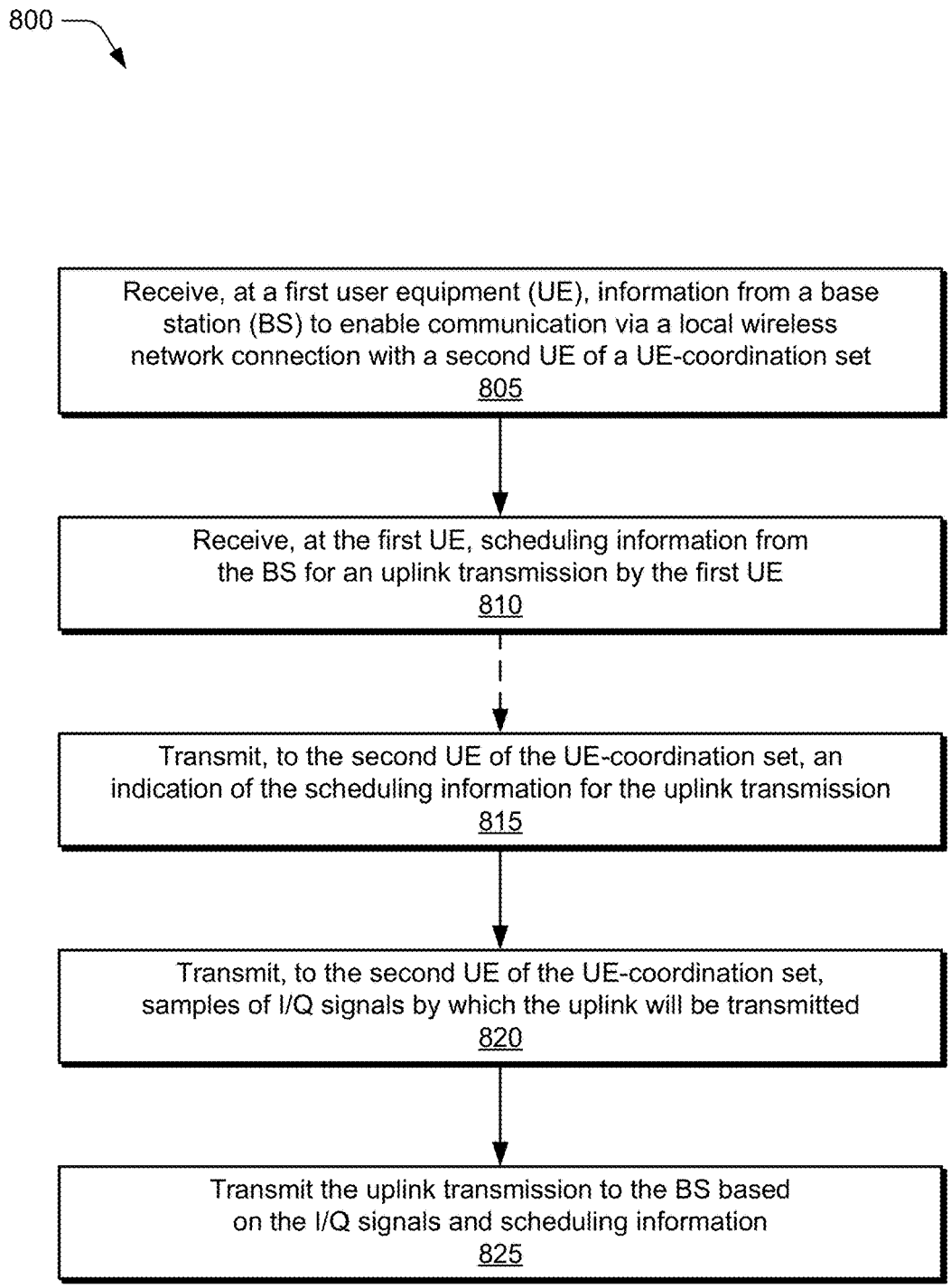
FIG. 8 illustrates an example method for transmitting information to another user equipment to enable interference cancelation.

FIG. 8 illustrates an example method for transmitting information to another user equipment of a UE-coordination set to enable interference cancelation. In some aspects, operations of the method 800 are implemented by or with an interference canceler 220 of a UE 110. Alternately or additionally, the operations of the method 800 can be implemented by other entities described herein, such as the UEs of a user equipment coordination set 410.

At 805, information is received, at a first user equipment UE from a base station to enable communication via a local wireless network connection with another UE of a UE-coordination set. For example, the information may enable configuration or establishment of a millimeter wave link, a sub-millimeter wave link, a free space optical link, or a wireless local access network link between the first UE and the second UE. In some cases, the local wireless network connection between the first UE and the second UE is in an unlicensed frequency band. In such cases, the first UE may determine a configuration for resources in the unlicensed frequency band and transmit the configuration information to the second UE. Alternately, the first UE may receive configuration information from the second UE that is useful to configure a transceiver of the first UE for communication in the unlicensed frequency band.

At 810, scheduling information is received from the base station for an uplink transmission by the first UE. The scheduling information may indicate frequency and time scheduling information for air interface resources allocated (e.g., by the base station) to the first UE for the uplink transmission. Optionally at 815, an indication of the scheduling information for the uplink transmission is transmitted to the second UE of the UE-coordination set. In some cases, the indication is transmitted to the second UE directly over the local wireless network connection or through respective base stations.

At 820, samples of I/Q signals for the uplink transmission are transmitted to the second UE of the coordination set. In some cases, the first UE communicates at least the signaling information with the second UE directly over the local wireless network connection and not through one of the respective base stations. At 825, the uplink transmission is transmitted by the first UE to the base station based on the I/Q signals and in accordance with the scheduling information.

Although aspects of user equipment coordination for interference cancelation have been described in language specific to features and/or methods, the subject of the appended claims is not necessarily limited to the specific features or methods described. Rather, the specific features and methods are disclosed as example implementations of user equipment coordination for interference cancelation, and other equivalent features and methods are intended to be within the scope of the appended claims. Further, various different aspects are described, and it is to be appreciated that each described aspect can be implemented independently or in connection with one or more other described aspects.

What is claimed is:

1. A method performed by a first user equipment (UE) of a user equipment-coordination set (UE-coordination set) to cancel interference in coordination with a second UE of the UE-coordination set, the method comprising:
   receiving, by the first UE and from the second UE, information regarding an uplink transmission of the second UE to a second base station, the received information including I/Q samples for the uplink transmission of the second UE;
   based on the received information, modeling interference from the uplink transmission of the second UE to a reception of a downlink transmission by a first base station to the first UE;
   receiving, by the first UE, the downlink transmission from the first base station; and
   based on the modeling of the interference, canceling, by the first UE, the interference to the received downlink transmission from the uplink transmission of the second UE.

2. The method of claim 1, wherein:
   the modeling of the interference comprises generating, by the first UE and using the I/Q samples, a filter to cancel the interference; and
   the canceling the interference comprises applying, by the first UE, the generated filter to signals of the received downlink transmission.

3. The method of claim 1, wherein the canceling the interference comprises subtracting, by the first UE, the modeled interference from signals of the downlink transmission.

4. The method of claim 1, wherein the information regarding the uplink transmission of the second UE to the second base station includes modulation coding scheme (MCS) information for the uplink transmission of the second UE.

5. The method of claim 1, wherein the information regarding the uplink transmission of the second UE to the second base station includes scheduling information indicating frequency and time scheduling information for air interface resources allocated to the second UE for the uplink transmission.

6. The method of claim 1, wherein the first UE receives the information from the second UE over a local wireless network connection.

7. The method of claim 6, wherein:
   the local wireless network connection by which the first UE receives the information includes a millimeter wave link, a sub-millimeter wave link, a free space optical link, a wireless local access network connection, or a wireless personal area network connection.

8. The method of claim 7, wherein the information received by the first UE is first information; and
the method further comprising receiving, by the first UE, second information regarding the local wireless network connection from the first base station that enables the first UE to establish the local wireless network connection with the second UE.

9. The method of claim 7, wherein the first UE communicates with the second UE through the local wireless network connection in an unlicensed frequency band.

10. The method of claim 9, further comprising:
determining, by the first UE, configuration information for resources of the local wireless network connection in the unlicensed frequency band to enable communication between the first UE and the second UE; or
receiving, at the first UE and from the second UE, the configuration information for resources of the local wireless network connection that is useful to configure a transceiver of the first UE for communication through the local wireless network connection in the unlicensed frequency band.

11. The method of claim 1, further comprising:
receiving, by the first UE, second information from the first base station regarding scheduling of the uplink transmission of the second UE.

12. A first user equipment (UE) comprising:
a radio frequency (RF) transceiver;
a processor and memory system coupled to the RF transceiver and comprising instructions that are executable by the processor to direct the first UE to:
receive, by the first UE and from a second UE, information regarding an uplink transmission of the second UE to a second base station, the received information including I/Q samples for the uplink transmission of the second UE;
based on the received information, model interference from the uplink transmission of the second UE to a reception of a downlink transmission by a first base station to the first UE;
receive, by the first UE, the downlink transmission from the first base station; and
based on the modeling of the interference, cancel, by the first UE, the interference to the received downlink transmission from the uplink transmission of the second UE.

13. The first user equipment of claim 12, wherein the information regarding the uplink transmission of the second UE to the second base station includes scheduling information indicating frequency and time scheduling information for air interface resources allocated to the second UE for the uplink transmission.

14. The first user equipment of claim 12, wherein the information regarding the uplink transmission of the second UE to the second base station includes modulation coding scheme (MCS) information for the uplink transmission of the second UE.

15. The first user equipment of claim 12, wherein the first UE receives the information from the second UE over a local wireless network connection.

16. The first user equipment of claim 15, wherein:
the first UE communicates with the second UE through the local wireless network connection using one of an unlicensed frequency band, a millimeter wave link, a sub-millimeter wave link, a free space optical link, a wireless local access network connection, or a wireless personal area network connection.

17. A computer-readable storage medium comprising instructions that, responsive to execution by a hardware-based processor, direct a first user equipment (UE) comprising the hardware-based processor to:
receive, by the first UE and from a second UE, information regarding an uplink transmission of the second UE to a second base station, the received information including I/Q samples for the uplink transmission of the second UE;
based on the received information, model interference from the uplink transmission of the second UE to a reception of a downlink transmission by a first base station to the first UE;
receive, by the first UE, the downlink transmission from the first base station; and
based on the modeled interference, cancel, by the first UE, the interference to the received downlink transmission from the uplink transmission of the second UE.

18. The computer-readable storage medium of claim 17, wherein the information regarding the uplink transmission of the second UE to the second base station includes scheduling information indicating frequency and time scheduling information for air interface resources allocated to the second UE for the uplink transmission.

19. The computer-readable storage medium of claim 17, wherein the information regarding the uplink transmission of the second UE to the second base station includes modulation coding scheme (MCS) information for the uplink transmission of the second UE.

20. The computer-readable storage medium of claim 17, wherein:
the first UE receives the information from the second UE over a local wireless network connection; and
the first UE communicates with the second UE through the local wireless network connection using one of an unlicensed frequency band, a millimeter wave link, a sub-millimeter wave link, a free space optical link, a wireless local access network connection, or a wireless personal area network connection.

* * * * *